2 Sheets--Sheet 1.

I. S. & H. R. RUSSELL.
Earth-Closets.

No. 145,756.  Patented Dec. 23, 1873.

Witnesses:
Caleb J. Moore
Chas. Russell

Inventors:
Isaac S. Russell
Henry R. Russell

2 Sheets--Sheet 2.
I. S. & H. R. RUSSELL.
Earth-Closets.
No. 145,756.　　　　　Patented Dec. 23, 1873.
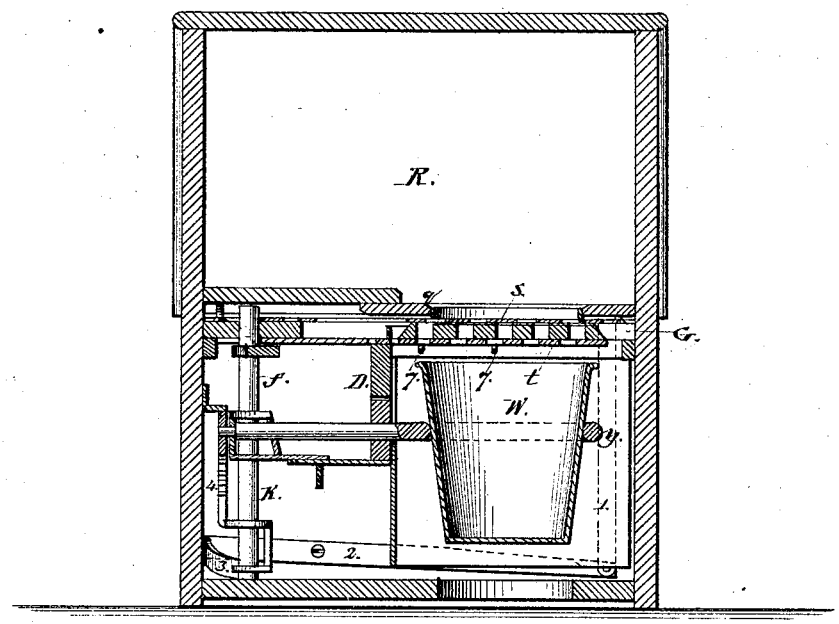
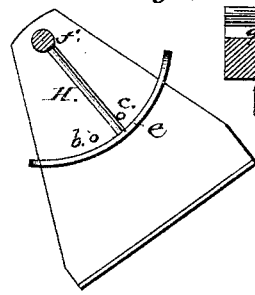 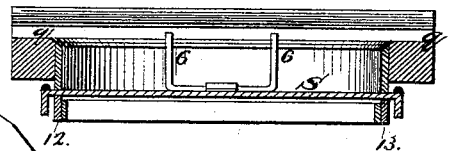
Witnesses:
Caleb J. Moore
Chas. Russell
Inventors:
Isaac S. Russell
Henry R. Russell

UNITED STATES PATENT OFFICE.

ISAAC S. RUSSELL, OF NEW MARKET, MARYLAND, AND HENRY R. RUSSELL, OF WOODBURY, NEW JERSEY.

IMPROVEMENT IN EARTH-CLOSETS.

Specification forming part of Letters Patent No. 145,756, dated December 23, 1873; application filed October 28, 1873.

*To all whom it may concern:*

Be it known that we, ISAAC S. RUSSELL, of New Market, county of Frederick and State of Maryland, and HENRY R. RUSSELL, of Woodbury, county of Gloucester and State of New Jersey, have invented an Improved Earth-Closet, of which the following is a specification:

It is the object of our invention to make an earth-closet, first, that shall be so far automatic that, when the seat-lid is raised or lowered, a definite quantity of dry earth or other deodorizer (called in this specification earth) shall be distributed over the contents of the receptacle; second, that may have the receptacle removed and its contents deodorized without lowering the seat-lid, and while the seat is occupied; and, third, that may have its receptacle inverted and the contents thereof thrown out, all of which shall be done entirely by means of interior mechanism.

Our invention applies to that form of the earth-closet in which the earth-reservoir is above and behind the seat; and is particularly designed as an improvement upon that for which Letters Patent were granted to your petitioners March 25, 1873; and the following is as full, clear, and exact a description of it as we can give, reference being had to the accompanying drawings, in which—

Figure 1:
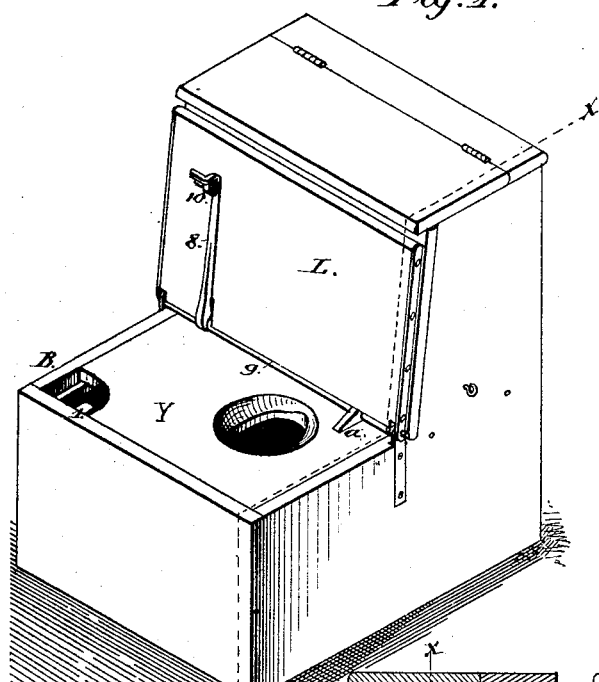
Figure 4:
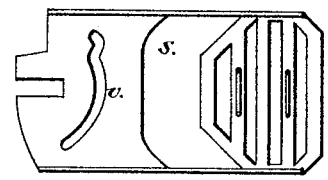
Figure 5:
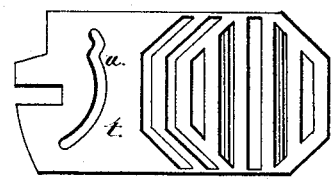
Figures 2, 3:
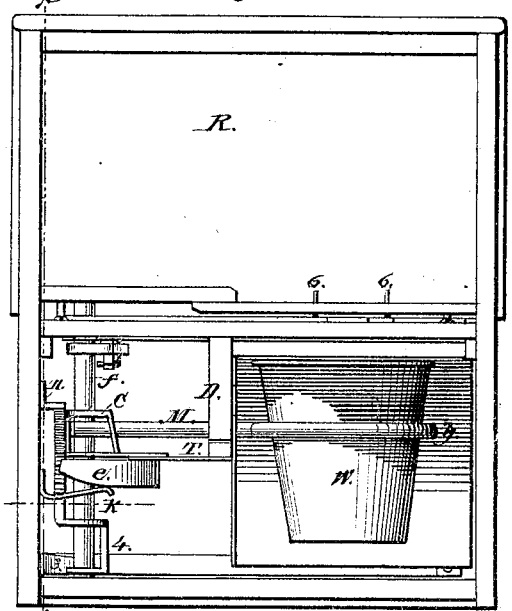

Figure 1 is a perspective view; Fig. 2, a transverse section on line $x$, Fig. 3; Fig. 3, a rear view with back removed; Fig. 4, upper slide; Fig. 5, lower slide; Fig. 6, section of discharger $g$, slides $s$ and $t$, and funnel $q$; Fig. 7, bottom view of arm H, catch $e$, and stops $b$ and $c$. Fig. 8 is an enlarged sectional view of slide $s$ and dispenser G, showing the projections 12 and 13 for supporting the slide $s$ above the dispenser.

The vertical shaft $f$, supported in sockets above and below, has, near its upper end, a horizontal arm, $n$, carrying a vertical finger, $i$, and is connected with the arm $a$ on the axis of the seat-lid by means of the connecting-rod $p$ and universal joints. Connected with shaft $f$ by means of the loose collar C, is the table T and the arm M, whose outer portion is formed into a ring, $y$, supporting the receptacle W. The arm M turns freely in the collar C, and by means of the pinion 5, rack 4, levers 3 and 2, and the pull-up 1, the receptacle W may be inverted and its contents discharged into a flue or pipe without moving the receptacle W from the ring $y$. This is particularly desirable when the closet is fixed, as it may be in hospitals and some other places. In this case the closet need not project into the room any farther than the width of the seat, and, of course, when the receptacle W is swung back under the reservoir R it will be directly within the wall, and the pipe for receiving the contents of receptacle W can be vertical, thereby avoiding all danger of clogging. The motion of vertical shaft $f$ in loose collars C is limited by the fixed arm H and the stops $b$ and $c$. The table T attached to collar C supports and carries the dust-door D.

Fig. 6 shows the discharger, consisting of grate or dispenser G and two slides, $s$ and $t$, in the bottom of reservoir R, Fig. 2, and toward the side opposite the shaft $f$. The dispenser G is in the form of a grate, circular, or any desired shape, of metal or any suitable material, the bars and spaces of which should be of equal width, (an inch, more or less,) and of such depth that it will hold enough earth for one discharge. It has projections or elevations at or on its edges, in order that the slide $s$ may be held above the dispenser G an eighth of an inch, more or less, to prevent the edges of the bars of the slide $s$ and the edges of the bars of the dispenser G from catching between them any small hard substances that may be in the earth. There should also be an elevation, and perhaps more, on the top of the dispenser G, to hold up the middle of slide $s$, in order to prevent its sagging with the weight of earth in the reservoir R.

The funnel $q$, which forms the passage for the earth from the reservoir R to the dispenser G, is cut away to the amount of an eighth of an inch, more or less along that portion of its circumference against which the slide $s$ would push the earth when moving, and for the before-mentioned reason. There are projections on dispenser G for fastening it in place to the frame-work, and at $o$ is a socket for upper end of shaft $f$.

The slides $s$ and $t$ may be made of metal, either sheet or cast. The upper one, s, has openings in it corresponding with those in the dispenser G. On its upper side the bars or agitators 6 may be attached, if necessary, to prevent the arching of the earth in the reservoir R. The lower slide t has its bars wider than the spaces, (a bar and space taken together, however, just equaling a bar and a space of the dispenser,) in order that the bars may the more securely close the openings of the dispenser G. It also has two bars more than the number necessary to close the openings in the dispenser. These additional bars are for the purpose of catching any earth that may be pushed outside of the dispenser G by the movement of the upper slide s. Any earth so pushed out will be retained on the lower slide t until it is moved, and will then fall into the receptacle W. On the under side of the lower slide t the wires or rods 7 may be attached, if desired, for the purpose of distributing the earth more evenly over the contents of the receptacle W; and they also have slots or cams v and u, so shaped that the desired movement may be given to them—that is to say, a portion of each slot is the arc of a circle of the same radius as that traversed by the finger i, in order that the slide may not be moved by the motion of the finger. Another portion diverges from this, in order that the finger i pressing against the side of it may give the required movement to each slide in turn at the proper time, and at the extremity of this divergent portion of each slot is an enlargement or curve, entirely relieving the finger i from any pressure against the side of the slots, and hence there is no strain on the seat-lid L tending to prevent it from remaining open or closed, as desired. The slide s is placed above the dispenser G and the one, t, below it, and the finger i enters the slots v and u. The finger i may have a roller upon it to lessen its friction in the slots v and u.

The discharger being put in position, as is shown by the parts not broken, the operation is as follows: When the seat-lid L is raised, the arm a brings the arm n forward, turning the shaft f and the arm M, carrying the receptacle W to position under the seat-opening, Fig. 1. At the same time the finger i plays in the slots v and u of the slides s and t. As it moves through the oblique portion of the lower one it closes it, but does not move the upper one, this portion of its slot having the same curve as that traversed by the finger i. Passing on through the curved portion of the lower one, it does not move it for a like reason; but coming to or into the oblique portion of the slot in the upper one, it opens that and allows the dispenser to fill. When the seat-lid is lowered, the reverse of this takes place, the arm n being driven backward, turning the shaft f and carrying the arm M and receptacle W till the latter is directly under the discharger, and tightly closing the dust-door D; the finger i, on its return, closing the upper slide and opening the lower one, and allowing the contents of the discharger to fall into the receptacle W. At each raising and lowering of the seat-lid, the same operation will be repeated.

The lever 8 is connected rigidly with the horizontal shaft 9, and is temporarily secured to the seat-lid by the hook or latch 10. By detaching this lever from the seat-lid, and depressing it when the seat-lid is raised, the receptacle W may be swung back under the reservoir R, and the contents deodorized while the seat is occupied. When the seat-lid is lowered, the lever 8 and latch 10 connect themselves and remain attached until again purposely detached. Thus it will be seen that this combination allows the closet to be operated in the simplest manner by the raising and lowering of the seat-lid; or it affords the occupant of the seat an opportunity to have the receptacle W removed from under him and its contents deodorized without danger of having the person soiled with the dust arising from the falling earth. In many instances, and particularly in case of invalids, this is very desirable.

The fixed arm H impinges against stops b and c, Fig. 6, on the bottom of table T, and limits the relative movements of the shaft f and arm M, so that when the seat-lid is raised to its full height the arm H is against one of the stops. At this moment the catch e, the fulcrum of which is attached to the arm H, engages with the edge of table T, and insures the movement of the arm M and receptacle W, when the seat-lid is lowered. When the arm M has moved so that the receptacle W is directly under the discharger, the wedge or incline k raises the end of the catch e, disengaging its hold on the edge of the table T, and allowing the shaft f, and the arm n, and finger i to complete their movement, and at the same time move the lower slide, dropping the earth into the receptacle W. This operation of the loose collar C, arm H, and catch e allows the closing of the dust-door D, and the putting of the receptacle W in proper place under the discharger before the earth begins to fall.

Our invention, though particularly described as belonging to the form of earth-closet for which a patent was granted to us March 25, 1873, is applicable to all closets in which the receptacle for excrement is removed back under the earth-reservoir.

The seat Y, Fig. 1, may be taken out, at pleasure, and the receptacle removed and emptied. In the fixed closet it can be emptied by means of the pull-up 1, levers 2 and 3, rack 4, and pinion 5. This can be done, however, only when the receptacle is under the reservoir and over the vault or waste-pipe, as in any other position the rack 4 is brought under the projection 11, and is thus prevented from being raised. Hence there is no danger that it will be overturned when not in proper place. The box B is for waste paper.

What we claim as our invention, and desire to secure by Letters Patent, is—

1. In combination with receptacle W, arm M, table T, and connecting mechanism, substantially as described, the lever 8, arranged to be detached from the seat-lid L, as and for the purpose set forth.

2. The slide t, constructed as described, in combination with the dispenser g and slide s, for the purpose set forth.

3. The projections or agitators on upper slide s, and bars or scatterers on lower slide t, for the purposes set forth.

4. The combination of the arm M, pinion 5, rack 4, levers 3 and 2, and pull-up 1, for inverting the receptacle.

5. The projections 12 and 13 on the dispenser G, or their equivalents, for supporting the slide s above the dispenser, in order that small hard particles will not be caught between the edge of the slide s and dispenser g, as described.

ISAAC S. RUSSELL.
HENRY R. RUSSELL.

Witnesses:
CALEB J. MOORE,
CHAS. RUSSELL.